United States Patent
Cheng

(10) Patent No.: US 6,419,107 B1
(45) Date of Patent: Jul. 16, 2002

(54) COOKWARE

(75) Inventor: Stanley Kin-Sui Cheng, Kowloon (HK)

(73) Assignee: Meyer Manufacturing Co. Ltd., Kowloon (HK)

(*) Notice: Subject to any disclaimer, the term of this patent is extended or adjusted under 35 U.S.C. 154(b) by 0 days.

(21) Appl. No.: 09/567,546

(22) Filed: May 5, 2000

(51) Int. Cl.[7] .............................................. B65D 51/00
(52) U.S. Cl. ............................. 220/573.1; 220/366.1; 220/912
(58) Field of Search ..................... 220/573.1, 573.2, 220/573.4, 573.3, 366.1, 912; D7/354, 912

(56) References Cited

U.S. PATENT DOCUMENTS

| | | | | |
|---|---|---|---|---|
| 547,759 A | * | 10/1895 | Baraban | 220/573.1 X |
| 1,970,723 A | * | 8/1934 | Wolfe | 220/573.2 |
| 2,604,227 A | * | 7/1952 | Carriker | 220/573.1 |
| 2,867,352 A | * | 1/1959 | Kawano | 220/366.1 |
| 5,121,848 A | * | 6/1992 | Waligorski | 220/94 R |
| 5,201,264 A | | 4/1993 | Thelen et al. | 99/403 |
| 5,377,859 A | * | 1/1995 | Hacker | 220/287 |
| 5,388,732 A | | 2/1995 | Greger | 222/572 |
| 5,441,169 A | * | 8/1995 | Petty | 220/428 |
| 5,613,618 A | * | 3/1997 | Raoult | 220/366.1 X |
| 5,628,426 A | * | 5/1997 | Doyle et al. | 220/608 |
| 5,924,592 A | * | 7/1999 | Hieronymus | 220/574.1 |
| 6,029,843 A | * | 2/2000 | Kroscher et al. | 220/367.1 |
| 6,105,810 A | * | 8/2000 | Daenen et al. | 220/366.1 |

* cited by examiner

*Primary Examiner*—Steven Pollard
(74) *Attorney, Agent, or Firm*—Wood, Herron & Evans, L.L.P.

(57) ABSTRACT

A cookware 1 comprising a container 4 and a lid 2 fittable therewith, wherein when the lid 2 is fitted with the container 4, the container 4 and the lid 2 collectively define at least two differently sized openings 12, 14 allowing contents in the container 4 to be poured out.

5 Claims, 7 Drawing Sheets

COOKWARE

This invention relates to a cookware and, in particular a container for cooking, such as a cooking pan or pot

BACKGROUND OF THE INVENTION

There is a variety of cooking pans and pots to suit different cooking needs. For example, one type of cooking pot is equipped with a transparent lid so that the user can check the cooking progress by viewing the food being cooked through the transparent lid.

There is another type of cooking pot in which an intermediate cooking basket (or sieve) is loosely fitted inside the cooking container so that when the food is ready to be removed from the cooking container, a user can simply lift up the basket and the food contained therein can be conveniently separated from the water or oil in which it was cooked. However, introducing an additional component in a cookware inevitably increases the cost of manufacturing. It is also inconvenient and cumbersome to use as it means that the user needs to clean up one more piece of equipment after use.

Conventional cookware are either not provided with any spout allowing the easy outpouring of food from the cookware, or only one such spout is provided. There are. however, instances in which the user may cook two or more kinds of food in the same cookware, but wish to separate them after cooking easily. This cannot be, or at least not easily, carried out using conventional cookware.

It is thus an object of the invention to provide a cookware in which the above shortcomings are mitigated, or at least to provide a useful alternative to the public.

SUMMARY OF INVENTION

According to the present invention, there is provided a cookware comprising a container and a lid fittable therewith, wherein when the lid is fitted with the container, the container and the lid collectively define at least two differently sized openings allowing contents in the container to be poured out.

Preferably, the openings may be in the form of spouts arranged on an edge of the container and wherein at least two of the spouts are differently sized.

Suitably, the openings may allow selective out-pouring of food contained in the cookware.

Advantageously, the openings or the spouts arranged on the cookware may be substantially equi-distant from each other.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

An embodiment of a cookware according to the present invention is shown in FIGS. 1–7, and generally designated as 1.

Figure 1:
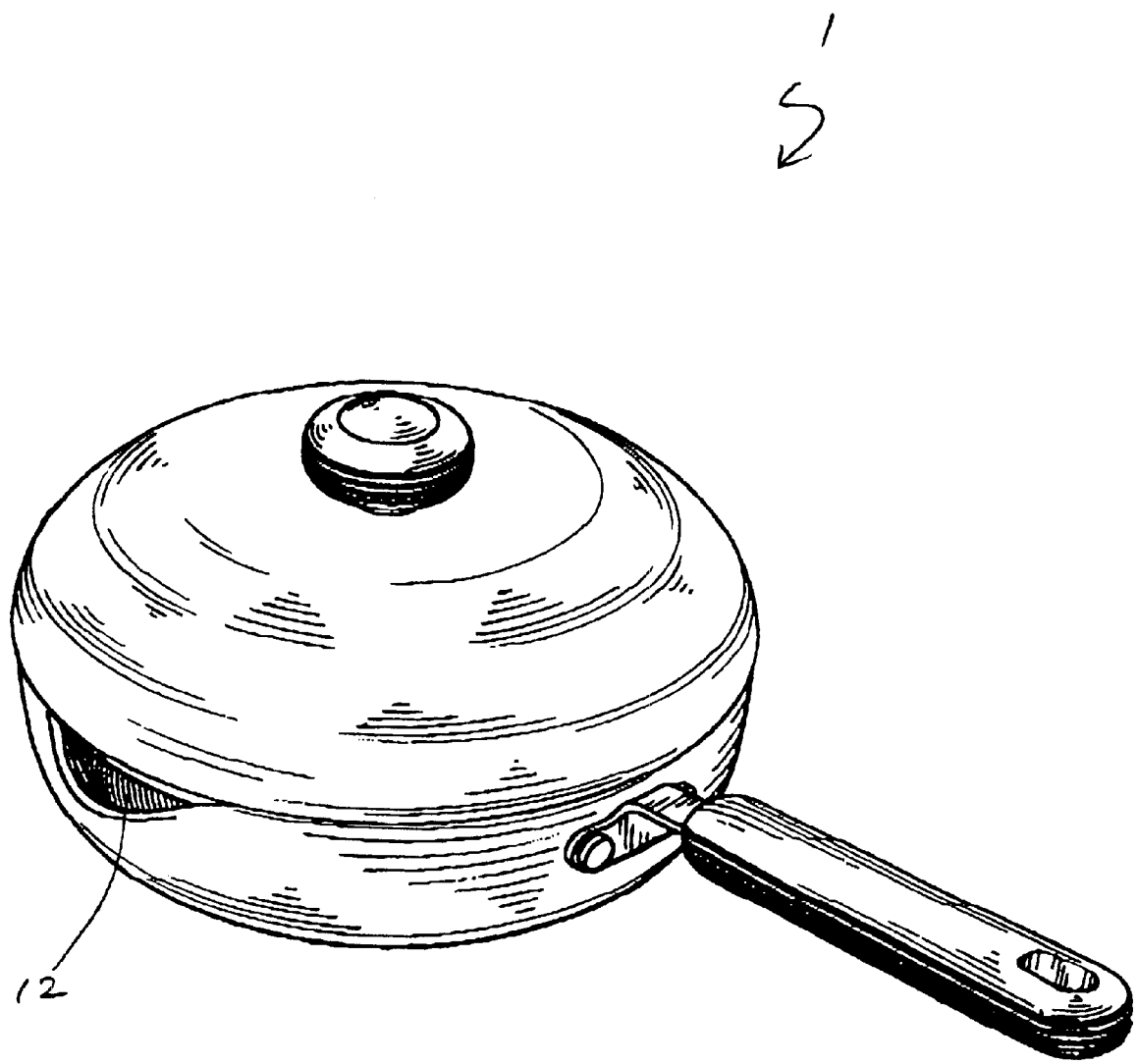
FIG. 1 is a perspective view of a cookware attached with a handle according to the present invention.
Figure 2:
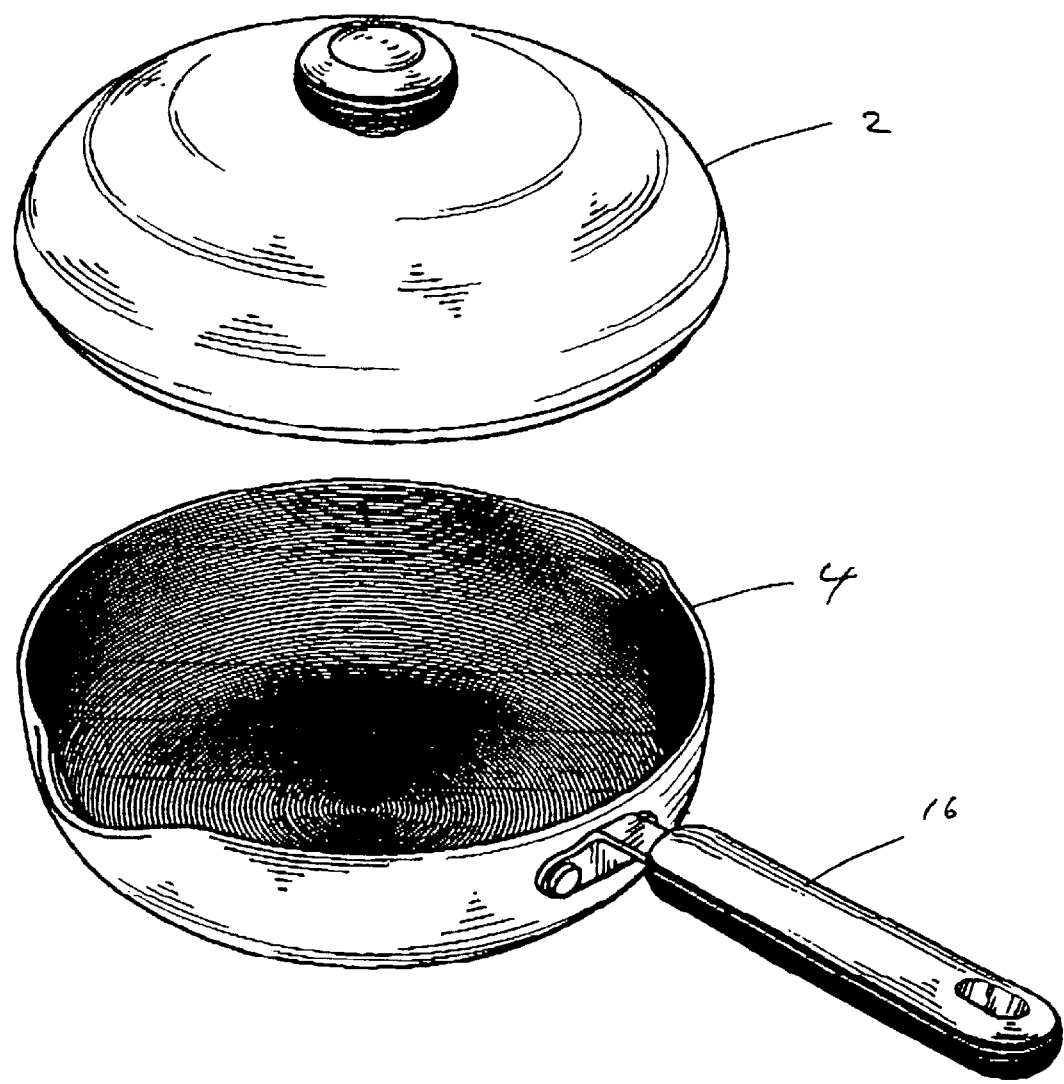
FIG. 2 is an alternate perspective view of a cookware showing a lid removed from a container shown in FIG. 1.

Referring to FIGS. 1 and 2, the cookware 1 is a stand-alone pot of a regular size. The cookware 1 comprises a cover 2 and a container 4 attached with a handle 16.

Figure 3:
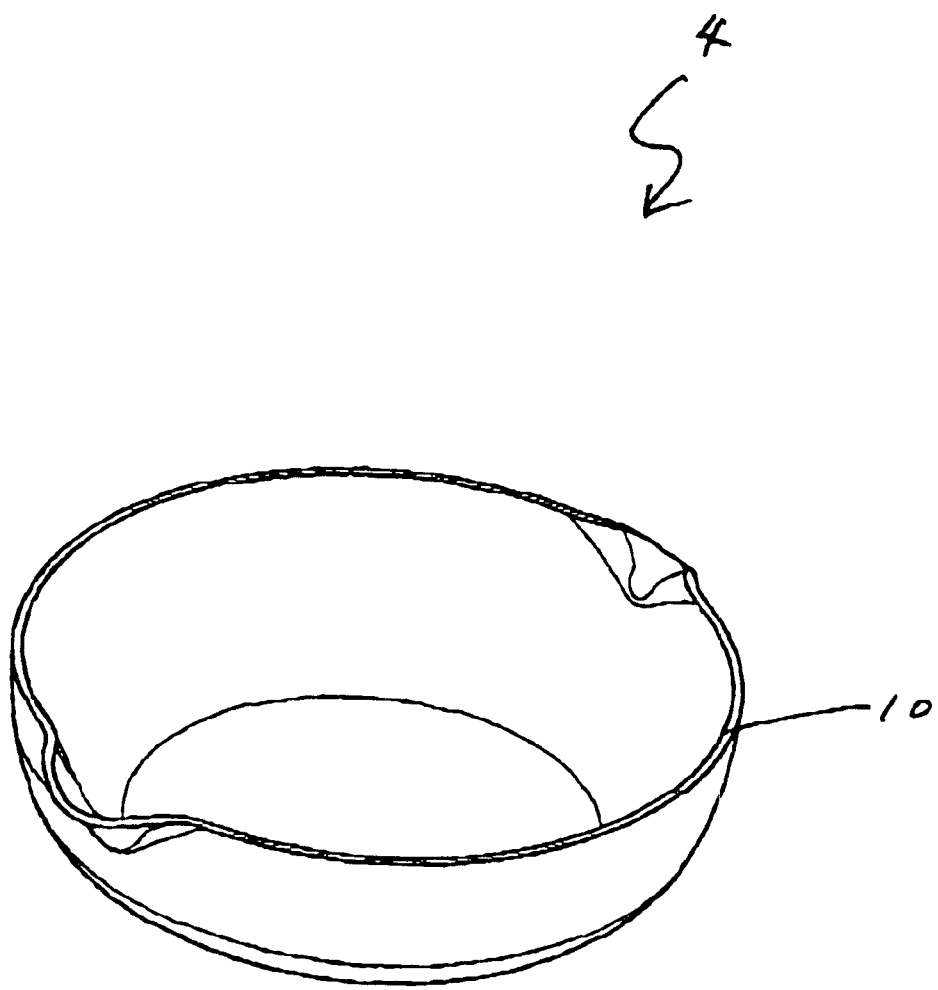
FIG. 3 is a schematic diagram showing the container shown in FIG. 2 without the handle.
Figure 4:
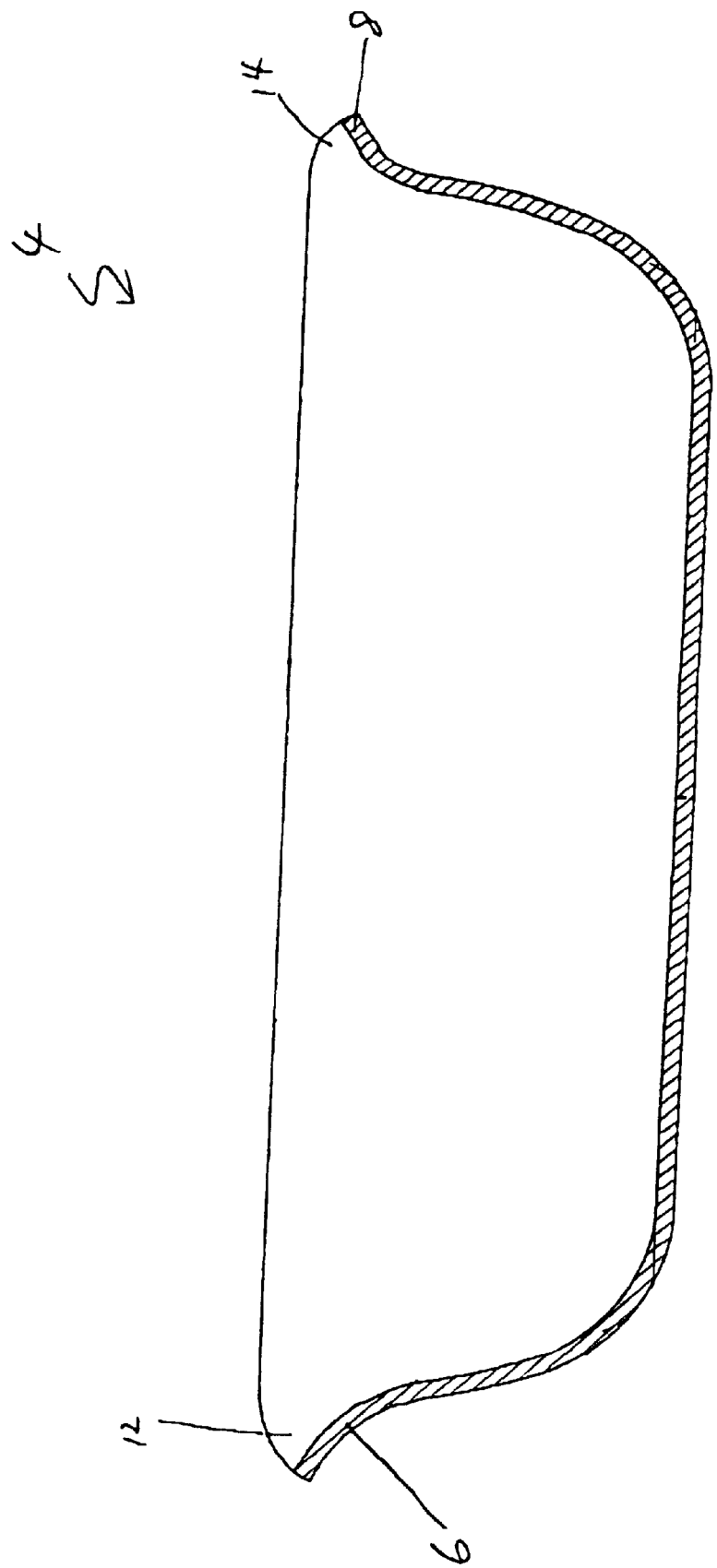
FIG. 4 is a schematic diagram showing a crosss sectional view of the container shown in FIG. 3.
Figure 5:
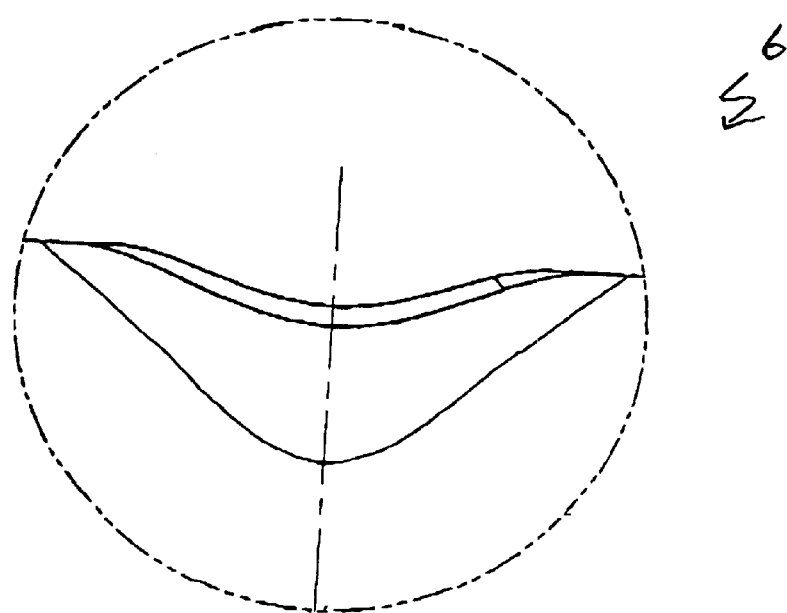
FIG. 5 is a schematic diagram showing a front view of a spout of the container shown in FIG. 4.
Figure 6:
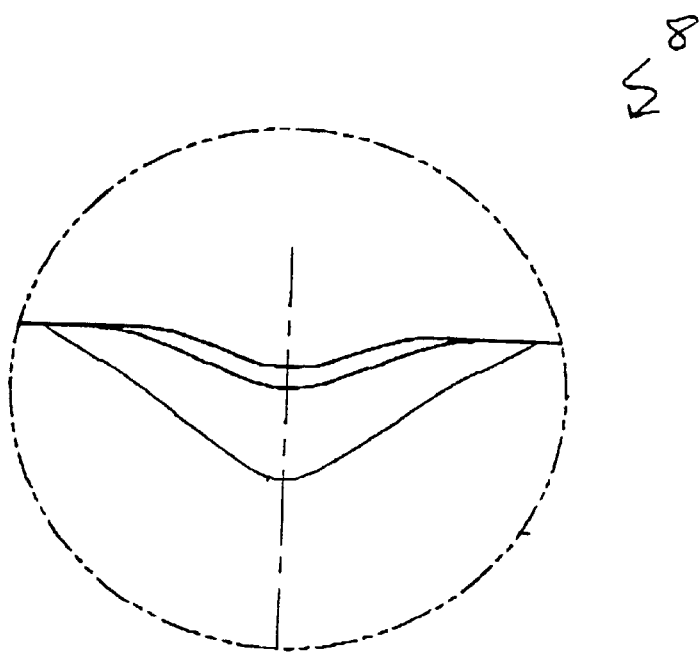
FIG. 6 is a schematic diagram showing a front view of another spout of the container shown in FIG. 5.
Figure 7:
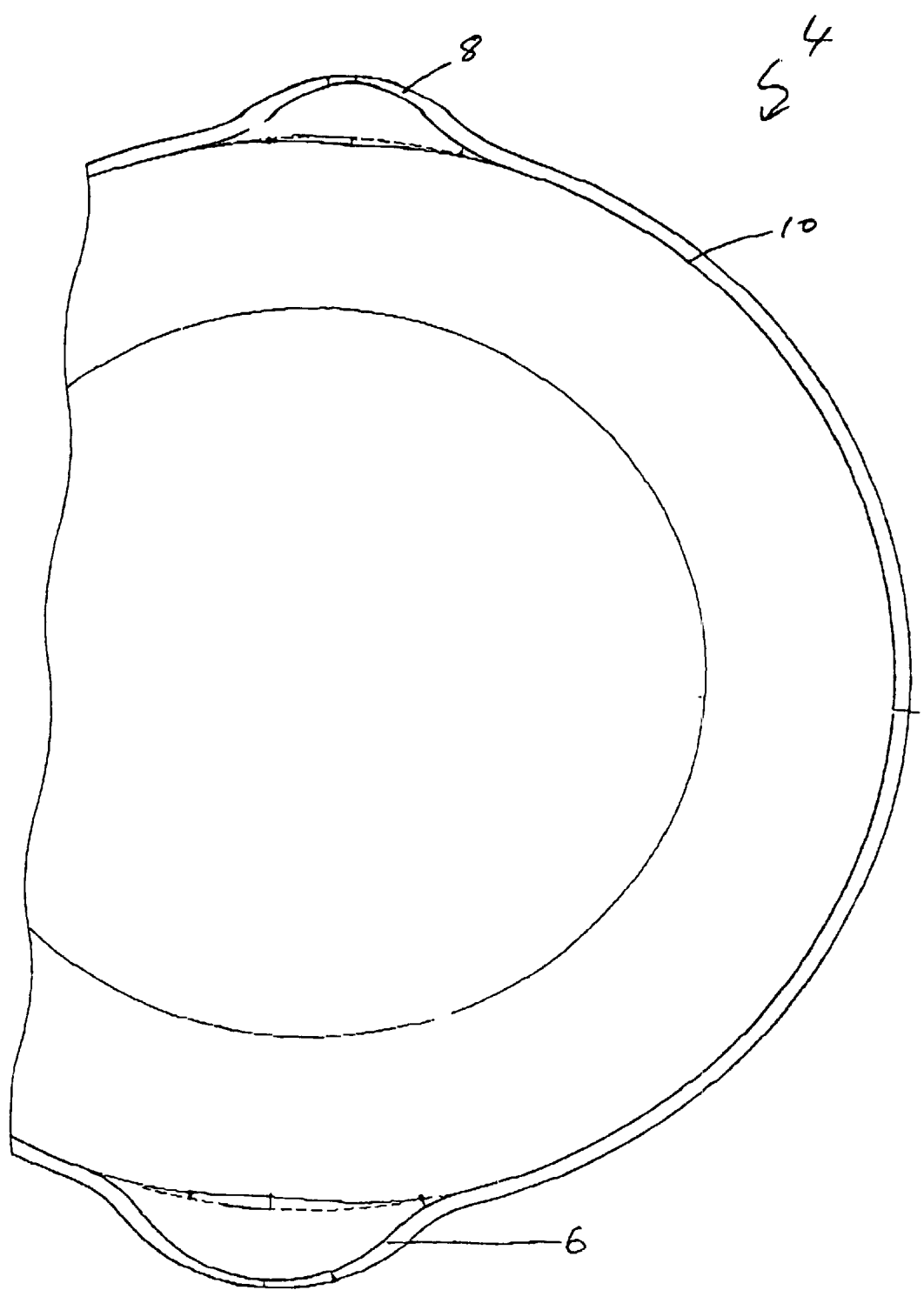
FIG. 7 is a schematic diagram showing a top view of a portion of the container shown in FIG. 6.
Figure 8:
FIG. 8 is a schematic diagram showing a cross sectional view of the lid of the container without a handle.

FIGS. 3–7 show cross sectional views of the cookware with the handle 16 removed. In particular, FIGS. 3 and 4 show cross sectional views of the container 4 of the cookware 1. Two spouts (6, 8) are arranged on an upper edge 10 of the container 4. As shown in FIGS. 1–7, the spouts (6, 8) are opposite to each other, When the lid 2 is fitted on the container 4. two openings (12. 14) are defined by the lid 2 and the container 4 in combination. As clearly shown in FIGS. 1–7, the spouts 6, 8 are different in size. In particular, the spout 6 is largely than the spout 8. Consequently, the openings 12, 14 defined by the lid 2 and the differently sized spouts 6, 8 are also different in size.

In use, when food contained in the container 4 is to be removed therefrom, a user may tilt the cookware 1 towards any one of the spouts. Fluid contained in the container 1 may be poured through the opening (12 or 14) from the spout (6 or 8). Depending on which spout the cookware is tilted towards, food stuffs of different size can be selectively poured out of or retained in the cookware 1. For instance, when water is to be separated from chunks of boiled broccoli, the user may tilt the cookware 1 towards the spout 6 which is larger than the spout 8. Water is poured out through the opening 12 from the spout 6 and the chunks of broccoli are retained in the container 1. This is because the opening 12 is smaller in size relative to a chunk of broccoli.

When smaller particles of food stuffs are to be retained in the cookware 1, a user may tilt the cookware towards the spout S which is smaller than the spout 8. Since the opening 14 is smaller in size than the opening 12, the smaller particles of food stuffs can be retained in the container 1. For instance, when water is to be separated from grains of corns boiled therein, the smaller spout 8 can be used. This is because the opening 12 is smaller relative to a grain of corn.

The cookware 1 can also be used to separate solid food stuffs of different size. For example, after boiling a mixture of chunks of broccoli and grains of corns, a user can tilt the cookware 1 towards the larger spout 6, i.e. the spout. Because of the smaller size of the grains of corn, they can be separated from larger chunks of broccoli.

As can be seen, cookware made according to the present invention can be used to separate a variety of foodstuffs, such as mixed vegetables, peas, spaghetti and so on.

According to the present invention, different sizes of cookware can be made to tailor for different cooking needs. In addition, differently sized spouts and different numbers of spouts can be arranged on a cookware to meet a variety of cooking and separating needs.

What is claimed is:

1. An article of cookware having a food-receiving body with an upper rim and a lid which can be fitted on the body, wherein said container and said lid define therebetween at least two differently sized openings allowing contents of the article of cookware to be poured out.

2. The article of cookware of claim 1 wherein said upper rim is formed with differently-sized spouts which define with said lid said openings.

3. The article of cookware of claim 2 wherein said spouts are arranged evenly spaced about a circumference of said upper rim.

4. The article of cookware of claim 2 having two spouts oppositely disposed on said body.

5. The article of cookware of claim 4 wherein the position of one of said spouts on said body is diametrically opposite from the position of the other of said spouts on said body.

* * * * *

UNITED STATES PATENT AND TRADEMARK OFFICE
CERTIFICATE OF CORRECTION

PATENT NO. : 6,419,107 B1
DATED : July 16, 2002
INVENTOR(S) : Stanley Kin-Sui Cheng It is certified that error appears in the above-identified patent and that said Letters Patent is hereby corrected as shown below:

<u>Title page, Item [54] and Column 1, line 1,</u>
Title reads "COOKWARE" and should read -- AN ARTICLE OF COOKWARE --.
Item [57], ABSTRACT,
Line 1, reads "A cookware 1 comprising a container 4" and should read -- An article of cookware 1 comprising a food-receiving body or container 4 --.

<u>Column 1,</u>
Lines 3, 18, 19, 30, 35, 36, 55 and 57, reads "a cookware" and should read -- an article of cookware --.
Line 4, reads "pan or pot" and should read -- pan or pot. --.
Line 7, reads "There is a" and should read -- There are a --.
Lines 23 and 29, reads "conventional cookware" and should read -- conventional articles of cookware --.
Line 25, reads "cookware" and should read -- article of cookware --.
Line 25, reads "There are." and should read -- There are, --.
Line 27, reads "same cookware" and should read -- same article of cookware --.
Lines 46 and 48, reads "the cookware" and should read -- the article of cookware --.
Line 61, reads "crosss sectional" and should read -- cross sectional --.

<u>Column 2,</u>
Lines 8 and 61, reads "a cookware" and should read -- an article of cookware --.
Lines 12-14, read "...the cookware 1 is a stand-alone pot of regular size. The cookware 1 comprises a cover 2 and a container 4 attached with a handle 16." and should read -- ...the article of cookware 1 is a stand-alone pot of a regular size. The article of cookware 1 comprises a lid 2 and a food-receiving body or container 4 attached with a handle 16. --.
Lines 15-18, read "FIGS. 3-7 show cross sectional views of the cookware with the handle 16 removed. In particular, FIGS. 3 and 4 show cross sectional views of the container 4 of the cookware 1. Two spouts (6,8) are arranged on an upper edge 10" and should read -- FIG. 4 shows a cross sectional view of the article of cookware with the handle 16 removed. Two spouts (6,8) are arranged on an upper rim 10 --.
Line 20, reads "each other," and should read -- each other. --.
Line 24, reads "is largely than" and should read -- is larger than --.
Line 29, reads "a user may tilt the cookware" and should read -- a user may tilt the article of cookware --.
Lines 32, 34, 36 and 42, reads "the cookware" and should read -- the article of cookware --.
Line 33, reads "food stuffs of" and should read -- foodstuffs of --.
Line 41, reads "food stuffs are to be retained in the cookware" and should read -- foodstuffs are to be retained in the article of cookware --.

UNITED STATES PATENT AND TRADEMARK OFFICE
CERTIFICATE OF CORRECTION

PATENT NO.    : 6,419,107 B1
DATED         : July 16, 2002
INVENTOR(S)   : Stanley Kin-Sui Cheng It is certified that error appears in the above-identified patent and that said Letters Patent is hereby corrected as shown below:

<u>Column 2 cont'd.,</u>
Line 43, reads "spout S which is smaller" and should read -- spout 8 which is smaller --.
Line 45, reads "food stuffs can be retained" and should read -- foodstuffs can be retained --.
Line 46, reads "grains of corns" and should read -- kernels of corn --.
Line 48, reads "grain of corn." and should read -- kernel of corn. --.
Line 49, reads "The cookware 1" and should read -- The article of cookware 1 --.
Line 51, reads "grains of corns," and should read -- kernels of corn. --.
Lines 52 and 59, reads "cookware" and should read -- articles of cookware --.
Line 52, reads "spout 6, i.e. the spout" and should read -- spout, i.e. the spout 6 --.
Line 53, reads "of the grains of corn," and should read -- of the kernels of corn, --.
Line 55, reads "cookware" and should read -- an article of cookware --.

Signed and Sealed this

Fourth Day of March, 2003

JAMES E. ROGAN
*Director of the United States Patent and Trademark Office*